United States Patent

Poncet

[15] 3,635,088
[45] Jan. 18, 1972

[54] MEASURE OF THE TEMPERATURE OF HOT ENERGY-RADIATING BODIES

[72] Inventor: Pierre Poncet, 12 bis, Rue Trarieux, Lyon (Rhone), France

[22] Filed: Sept. 23, 1969

[21] Appl. No.: 860,279

[52] U.S. Cl. ................................73/355 R, 356/45, 356/46, 356/206
[51] Int. Cl. ..........................................G01j 5/54, G01j 5/60
[58] Field of Search ..............73/355, 344; 356/45, 194, 205, 356/206, 229, 230, 231, 46

[56] References Cited

UNITED STATES PATENTS

| | | | |
|---|---|---|---|
| 2,878,003 | 3/1959 | Dykeman et al. | 73/341 X |
| 3,506,358 | 4/1970 | Baba et al. | 356/206 X |
| 3,538,337 | 11/1970 | Hrdina | 356/206 X |
| 2,652,743 | 9/1953 | Morrow | 356/45 |
| 2,978,589 | 4/1961 | Howell | 73/355 UX |
| 3,222,930 | 12/1965 | Smith | 73/355 |
| 3,474,671 | 10/1969 | Byron | 73/355 |

OTHER PUBLICATIONS

Nutter; G. D., General Considerations Influencing the Design of a High-Accuracy Pyrometer, Chapter 54 in Part I, Vol. 3 of Temperature— Its Measurement and Control in Science and Industry, American Inst. of Physics, Reinhold, New York, 1962, p. 538, QC- 271- A6

Broida; H. P., Experimental Temperature Measurements in Flames and Hot Gases, Chapter 17 in Temperature— Its Measurement and Control in Science and Industry. American Inst. of Physics, Vol. 2, Reinhold, New York, 1955. p. 282, QC-271- A6.

*Primary Examiner*—Louis R. Prince
*Assistant Examiner*—Frederick Shoon
*Attorney*—Alexander & Dowell

[57] ABSTRACT

Apparatus for determining the wavelength which corresponds to the maximum of the curve intensity of radiated energy versus wavelength of the emission received from a radiating body. For this purpose photosensible means detect a difference in the intensities of the energy received at two points disposed close to each other along the length of a spectrum of the emission of the body and these two points are displaced relatively to the length of the spectrum until this difference disappears. The maximum is then situated about midway between the points. The photosensible means may be in the form of a pair of photoelectric cells or of a single cell receiving the radiation alternately from one and the other point. The invention may be used in association with a standardized emitter to determine the importance of absorption phenomena or of the more or less "black" character of the body whose temperature is being measured.

4 Claims, 8 Drawing Figures

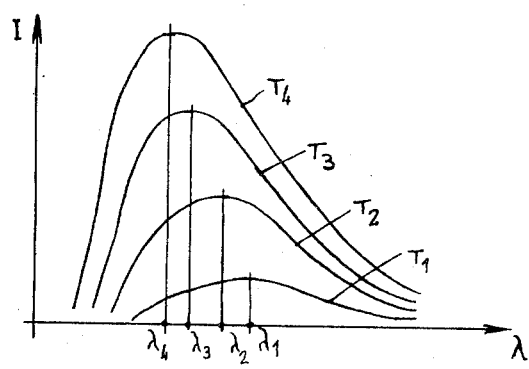
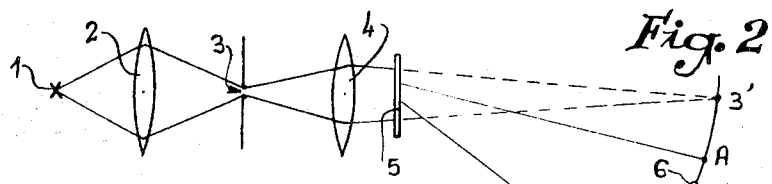
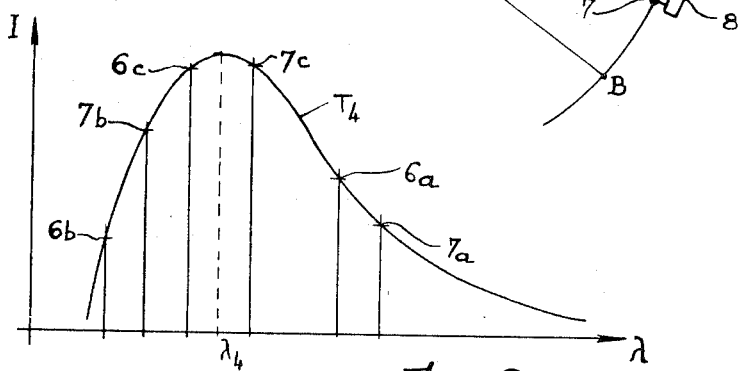
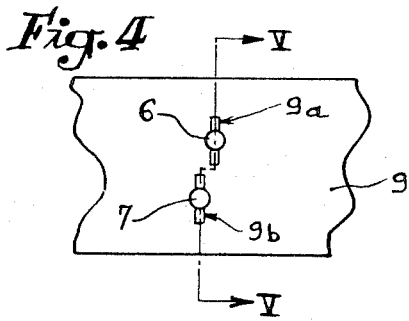
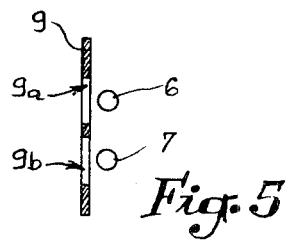

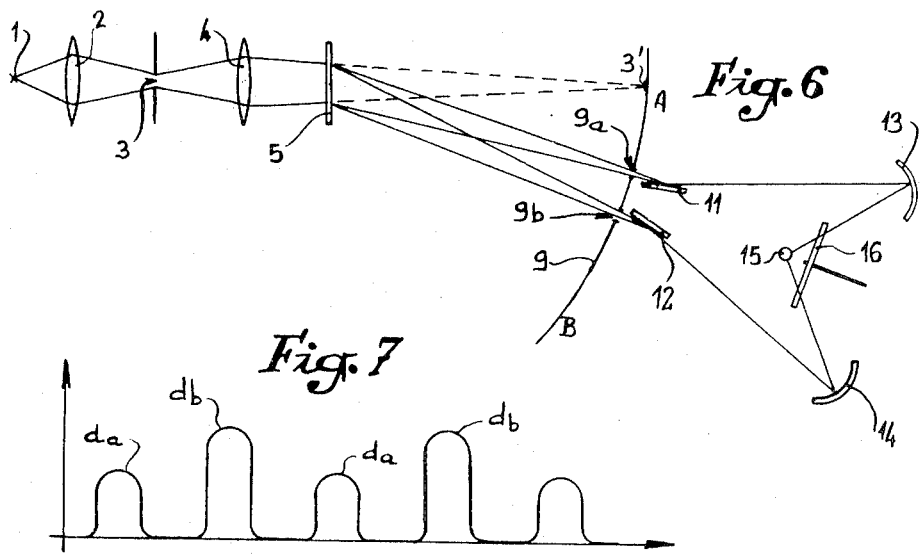
*Fig. 6*
*Fig. 7*
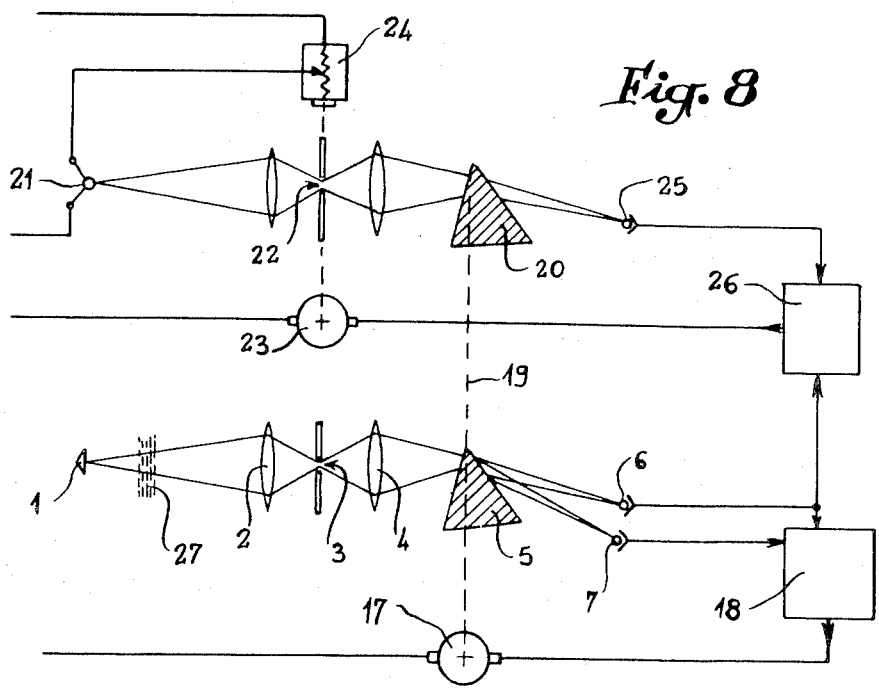
*Fig. 8*

MEASURE OF THE TEMPERATURE OF HOT ENERGY-RADIATING BODIES

DESCRIPTION

This invention relates to the measurement of the temperature of a hot body by relying on its radiant energy.

It is known that the total energy radiated by a hot body such as for instance a mass of metal in a furnace or in a tundish, a refractory wall, etc. ..., is a function of the fourth power of its temperature. In order to determine this temperature it is therefore sufficient to measure the intensity of the radiated energy by means of a so-called optic pyrometer. Unfortunately a substantial proportion of this energy is absorbed by the more or less transparent medium situated between the radiating body and the pyrometer. Thus a quite small amount of smoke renders quite impossible any direct pyrometric measuring operation.

In the so-called bicolor method a beam of the optical energy radiated by the body is decomposed into a spectrum by a prism or the like and the radiated energy (or more exactly its intensity) is measured at two predetermined adjacent points along the length of this spectrum, i.e. for two predetermined adjacent wavelengths or colors. The ratio of these two energies corresponds to the slope of the curve radiated energy versus wavelength in the zone comprised between the two points and this slope is a function of the temperature. But here again absorption by smokes or the like reduces the accuracy of the measurement. Furthermore for a relatively large temperature variation, the variation of the slope is relatively small and therefore the photoelectric cells, the amplifiers and like electric devices required with such a method should be extremely sensitive and accurate.

It is an object of the present invention to provide a method which will be unaffected by the presence of a noticeable amount of smoke between the radiating body and the optical apparatus and which will not require high-precision electronic equipment.

In accordance with the present invention a method for measuring the temperature of an energy-radiating body consists in determining the wavelength which corresponds to the maximum of its curve intensity of radiated energy versus wavelength.

The position of this maximum along the axis of abscissae (wavelengths) of the curve may be detected by comparing the intensities received at two adjacent points along an optical spectrum of the radiant energy emitted by the hot body, somewhat as in the bicolor method, but while in the latter the points are maintained at a fixed location on the spectrum, in accordance with the present application, they are displaced in unison along the said spectrum until the corresponding energies received are exactly equal. When such is the case, the maximum is situated substantially midway between the two points. This operation may be effected by means of two identical photoelectric cells disposed close to each other along the spectrum, preferably behind narrow slits, the relative displacement between the cells and the spectrum being conveniently realized by angularly displacing the prism, grating or equivalent light-decomposing device until the responses of both cells are equal. In a modification the spectrum is projected on a screen having two close parallel slits and the beams issuing from these slits are directed in alternate succession towards a single photoelectric cell, the response of the latter being in the form of alternate pulses of different magnitude until the maximum of the curve corresponds to the point of the spectrum situated substantially midway between the slits.

The knowledge of the exact temperature of the energy-radiating body may further be used for determining the importance of the absorption phenomena, or the more or less black character of the body by comparing for the same wavelength the intensity received from the body with the intensity received from an adjustable radiating source maintained at the same temperature.

In the accompanying drawings:

FIG. 1 shows a set of curves depicting radiated energy versus wavelength for a number of temperatures.

FIG. 2 diagrammatically illustrates an apparatus according to the invention including two photoelectric cells.

FIG. 3 illustrates the operation of the apparatus of FIG. 2.

FIGS. 4 and 5 show respectively in elevation and in section taken along line V—V (FIG. 4) a preferred arrangement of the cells in the apparatus of FIG. 2.

FIG. 6 diagrammatically shows a modified apparatus having a single photoelectric cell.

FIG. 7 illustrates the response of this single cell shown in FIG. 6.

FIG. 8 is a diagrammatical representation of an apparatus for determining the importance of the absorption phenomena or for appreciating the more or less black character of the emitting body.

FIG. 1 diagrammatically shows a set of curves depicting radiated energy (or intensity I) versus wavelength ( ) corresponding to a number of temperatures $T_1$, $T_2$, $T_3$, $T_4$. Each curve has a maximum situated at a wavelength $\lambda_1$, $\lambda_2$, $\lambda_3$, $\lambda_4$, this position being uninfluenced by smoke or like usual light-absorbing media. When the wavelength at which the maximum occurs is determined, the temperature of the radiating body is known with a quite satisfactory accuracy.

Of course curves $T_1$, $T_2$, $T_3$, $T_4$ correspond to a given body, as for instance for the theoretical black body. But most bodies (as for instance molten metals) behave at high temperatures almost exactly as this black body and it is moreover possible to use correcting coefficients in order to eliminate the small residual errors. Furthermore the curves may be plotted for any given body, if desired. It is also necessary that the absorption of energy by the intermediate medium be unselective (i.e., independent of the wavelength), at least in the zone of the maximum, but this condition is generally fulfilled in the case of smoke. As to air and other gases, their absorption, while being sometimes noticeably selective, is generally of quite small importance and does not impair the accuracy of the maximum detecting operation.

In FIG. 2 reference numeral 1 designates a substantially black body the temperature of which ($T_4$ for instance) is to be determined. A fraction or beam of its radiated energy is received by a lens 2 which concentrates this beam on a narrow slit 3 provided in an appropriate opaque screen. The rays issuing from this slit 3 reach an objective lens 4 which would normally form at 3' an image of the slit 3 of the screen. A light-decomposing device 5, as for instance a grating, is disposed behind lens 4 in such manner as to form an optical spectrum AB of the radiation of body 1. Two photoelectric cells 6 and 7 supported close to each other by a carriage 8 may be displaced along this spectrum AB, these cells being connected with an appropriate electronic equipment (not illustrated) by means of which their responses may be compared. If carriage is situated well beyond the point of spectrum AB which corresponds to the maximum of the curve $T_4$, the energy received by cells 6 and 7 will be represented by the ordinates of points such as 6a and 7a (FIG. 3). The electronic equipment will detect that the response of cell 6 is stronger than that of cell 7 (negative slope of curve $T_4$). If on the other hand carriage 8 had been disposed on the other side of the maximum (points 6b and 7b) the difference would have been in the other direction (positive slope). The outlet of the electronic equipment may therefore act on an appropriate servomotor in order to displace carriage 8 towards the left in the first case or towards the right in the second one (direction of ascending slope or of increasing intensities). Finally carriage 8 will stop at the position for which the responses of both cells are of equal magnitude (points 6c, 7c). The point of spectrum AB corresponding to the maximum of curve $T_4$ will be situated substantially midway between points 6c and 7c. The corresponding wavelength $\lambda_4$ is an accurate indication of the temperature $T_4$ of body 1. The operation is unaffected by smoke or by appreciable amounts of combustion gases such as carbon dioxide. The electronic equipment has only to compare the responses of the cells and not to measure these responses in a particularly accurate manner. It may for instance comprise a conventional differential amplifier. The photoelectric equipment may comprise photomultipliers, if desired.

Of course instead of displacing the cells along the spectrum, the latter could be displaced so as to sweep across the cells, as for instance by rotating the grating 5, in which case the latter may drive a pointer on a dial to indicate directly the temperature when the equilibrium is reached between cells 6 and 7. The lenses such as 2 and 4 which in practice absorb a large portion of infrared energy, might be replaced by spherical mirrors.

FIGS. 4 and 5 illustrate a practical arrangement in which two photoelectric cells such as 6 and 7 may be disposed quite close to each other along the spectrum in order to reduce the horizontal distance between points 6c and 7c in FIG. 3 and thus to improve the determination of $\lambda_4$. The spectrum AB of FIG. 2 is received on an arcuate opaque screen 9 FIGS. 4 and 5 formed with two narrow slits 9a and 9b disposed at two different levels (i.e., at two different positions across screen 9), but close to each other in the horizontal (or longitudinal) direction. The cells 6 and 7 are respectively mounted behind slits 9a and 9b and they thus receive two narrow beams corresponding to two points situated horizontally close to each other on curves such as $T_4$.

In the embodiment of FIGS. 2, 4 and 5, the photoelectric cells should be quite identical during their life and this condition should be frequently checked in actual practice. The apparatus diagrammatically illustrated in FIG. 6 avoids this disadvantage by using a single cell. This apparatus comprises the arcuate screen 9 with its slits 9a and 9b. The beams issuing from these slits are deviated by mirrors, such as 11 and 12, towards spherical mirrors 13 and 14 which concentrate them towards a common photoelectric cell 15. A rotating disk 16 is interposed between cell 15 and mirrors 13, 14, this disk being formed with notches or apertures which permit alternately passage of the beam from mirror 13 and of the beam from mirror 14. The response of the cell 15 appears therefore as illustrated in FIG. 7, i.e. as a succession of alternate pulses da, db of unequal height or magnitude. An appropriate electronic equipment detects the difference between da and db and acts on the prism or grating 5 so as to displace the spectrum in the proper direction along screen 9, that is to say across slits 9a and 9b. Here again when the equilibrium is reached between pulses da and db, the wavelength of the point of the spectrum situated horizontally (or longitudinally) midway between slits 9a and 9b corresponds to the wavelength $\lambda_4$ of FIG. 3 and therefore constitutes an accurate indication of the temperature of body 1.

FIG. 8 illustrates how the invention may be used for the measure of the absorption of the radiated energy by the surrounding media, or for having the indication of the black character, or of the "color" of the radiating body. The importance of absorption phenomena is of interest for the detection of smoke. As to the color of the radiating body it may constitute for instance an indication of the thickness of the slag on a bath of molten metal within a mould, tundish, furnace or the like.

In FIG. 8 a beam from a black radiating body 1 is received by a first lens 2 so as to illuminate a slit 3, the rays which issue from the slit reaching an objective lens 4 with which is associated a light-decomposing device 5, here illustrated in the form of a prism. Two photoelectric cells 6, 7 disposed close to each other along the spectrum thus realized, are connected with an electronic comparator 18. The outlet of the latter controls a servomotor 17 adapted to drive a shaft 19 which supports prism 5.

The shaft 19 also carries another prism 20 which receives a beam from an electric bulb 21 through an optical assembly similar to that disposed between body 1 and prism 5, except that the slit, here referenced 22, is adjustable in width by means of a servomotor 23 (in other words motor 23 controls a slitlike diaphragm). A photoelectric cell 25 is disposed on the spectrum formed by prism 20. Its outlet is connected with a second comparator 26. The outlet of comparator 26 is used for the actuation of motor 23.

As above explained, under the action of the comparator 18 the servomotor 17 positions prism 5 so as to realize the equilibrium between the responses of cells 6 and 7, and the angular position of shaft 19 is a direct indication of the temperature of the radiating body 1, irrespective of the importance of an absorbing mask 27 of smoke or the like. The rheostat 24 is so adjusted that the temperature of the filament of bulb 21 is then equal to the temperature of body 1. The photoelectric cell 25 is disposed in such manner as to receive the same wavelength as cell 6. The comparator 26 actuates motor 23 and therefore diaphragm 22 until cells 6 and 25 receive the same energy (it being assumed that these cells are identical). The width of diaphragm 22 thus corresponds to the importance of the absorbing mask 27.

In the same manner in the absence of an absorbing mask 27 (or in the presence of a mask of known importance), if the apparatus has been adjusted for a black body and if it is used with a gray or colored body, the variation in the width of slit 22 is an indication of the "nonblack" character of the energy-radiating body.

I claim:

1. An apparatus for measuring the temperature of a hot energy-radiating body, comprising means to form a spectrum of the energy radiated by said body, said spectrum having a length;
   photosensible means receiving radiant energy from two distinct points of said spectrum disposed close to each other along said length;
   and means to displace said photosensible means along the length of said spectrum relatively to said two points in the direction of increasing energies until the intensities of the energies received at said two points are equal.

2. In an apparatus as claimed in claim 1, said photosensible means including two photoelectric cells respectively disposed at one and the other of said points; an opaque screen to receive said spectrum at least in the zone thereof where said points are located, said screen being formed with two transverse slits disposed at said points close to each other longitudinally of said spectrum but displaced with respect to each other transversely of said spectrum; and each of said photoelectric cells being disposed behind one of said slits to receive radiant energy emerging therefrom.

3. In an apparatus as set forth in claim 1, said photosensible means including a single photoelectric cell; and means to alternately project onto said cell beams of radiant energy from one and the other of said points, including an opaque screen to receive said spectrum at least in the zone thereof where said points are located, said screen being formed with two slits disposed at said points close to each other longitudinally of said spectrum, each for passage of a beam of radiant energy; means embodying mirrors to receive said beams and to concentrate same towards said single cell; and screen means to alternately interrupt one and the other of said beams.

4. In an apparatus as claimed in claim 1, an auxiliary source of radiant energy;
   means to vary the temperature of said source in unison with displacement of said two points along said spectrum in such manner that said temperature will be always equal to the temperature of said body when the intensities of the energy received at said two points are equal;
   means to form an auxiliary spectrum of the energy radiated by said auxiliary source;
   auxiliary photosensible means disposed at a point of said spectrum;
   means to displace said auxiliary spectrum relatively to said photosensible means along said auxiliary spectrum in unison with displacement of said two points along the spectrum of the energy radiated by said body in such manner that said auxiliary photosensible means receive at any time an energy of the same wavelength as the energy received at one of said points;

and diaphragm means interposed between said auxiliary source and said auxiliary photosensible means to permit obtaining equality between the intensities received from said auxiliary source by said auxiliary photosensible means and from said body at said one of said points by said photosensible means receiving radiant energy from said points.

* * * * *